Figure 1:
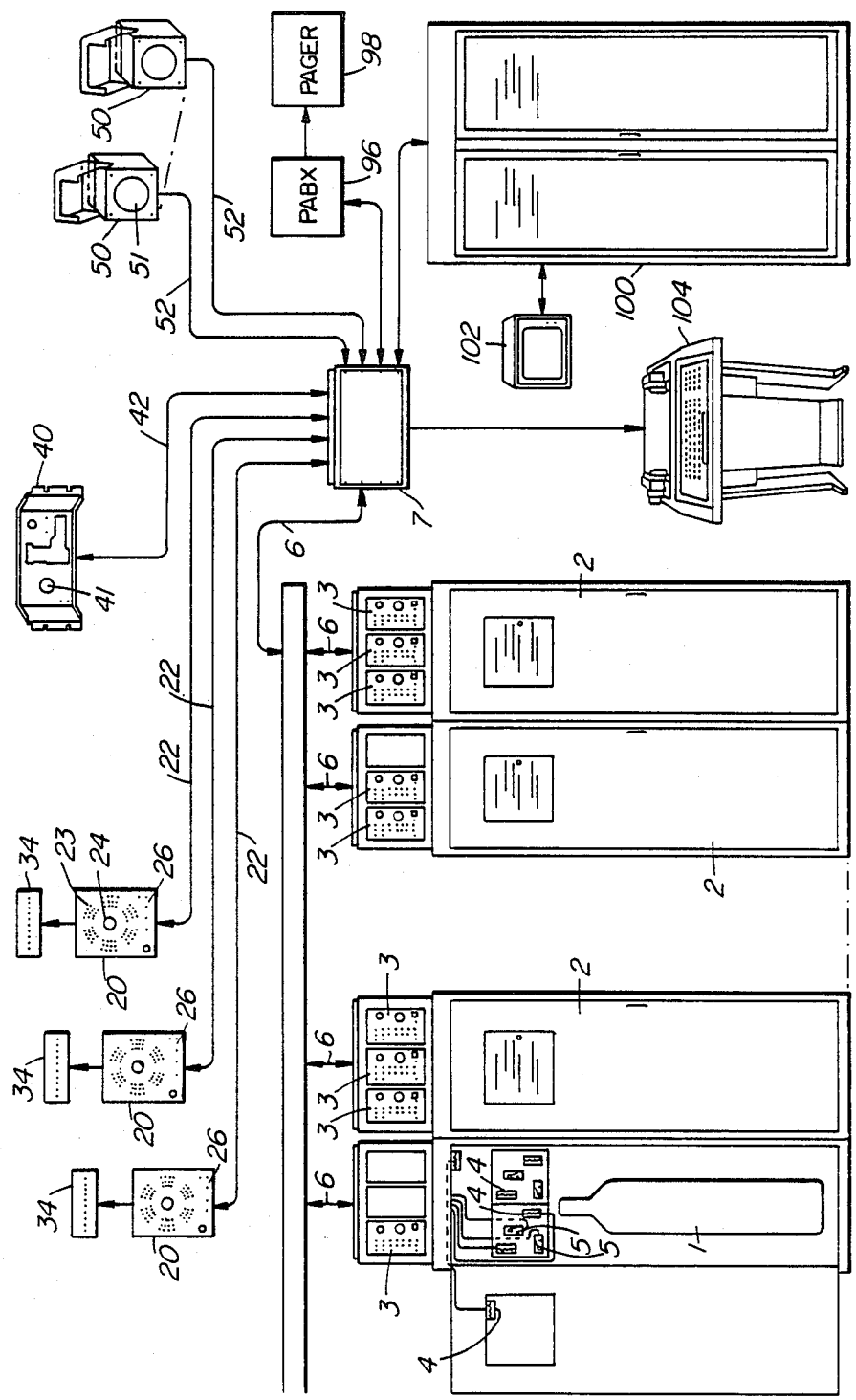

United States Patent [19]

David et al.

[11] Patent Number: 4,866,594

[45] Date of Patent: Sep. 12, 1989

[54] GAS CYLINDER MONITOR AND CONTROL SYSTEM

[75] Inventors: Guy David, Chomedey; Claude Lacasse, St-Paul d'Abbotsford; Christian Métivier, Granby; Luc Veillette, St-Jean, all of Canada

[73] Assignee: Mitel Corp., Ontario, Canada

[21] Appl. No.: 152,484

[22] Filed: Feb. 4, 1988

[30] Foreign Application Priority Data

Feb. 12, 1987 [CA] Canada ................................. 529.631

[51] Int. Cl.⁴ ......................... G05B 23/02; G06F 3/14
[52] U.S. Cl. ............................... 364/138; 340/825.06; 340/825.17; 340/506; 364/185; 364/550
[58] Field of Search ................ 364/138, 139, 131–136, 364/184, 185, 505, 506, 550, 551.01, 551.02, 152; 340/825.06, 825.07, 825.16, 825.17, 825.22, 825.36, 825.37, 825.44, 825.45, 825.49, 870.09, 506

[56] References Cited

U.S. PATENT DOCUMENTS

| | | | |
|---|---|---|---|
| 4,251,858 | 2/1981 | Cambigue et al. | 340/825.17 X |
| 4,298,955 | 11/1981 | Munday et al. | 364/900 |
| 4,380,796 | 4/1983 | Ostby | 364/138 X |
| 4,424,559 | 1/1984 | Lorincz et al. | 364/131 |
| 4,430,959 | 2/1984 | Ebata et al. | 364/472 X |
| 4,551,718 | 11/1985 | Cookson et al. | 340/825.16 |
| 4,703,325 | 10/1987 | Chamberlin et al. | 364/550.01 X |

Primary Examiner—Joseph Ruggiero
Attorney, Agent, or Firm—Antonelli, Terry & Wands

[57] ABSTRACT

A system for monitoring and controlling distributed functions within a building, such as the pressure and temperature of gases stored within cylinders. A plurality of modules are located at strategic points within the building for performing specific allocated functions in relation to monitoring and controlling the status of the gas cylinders. A first type of module detects dangerous conditions within the gas cylinders and generates and displays alarm signals in response thereto. A second type of module displays the alarm signals at a location remote from the gas cylinders and transmits command signals for remote shut off of a predetermined one or more of the gas cylinders. A central module interconnects each of the first and second modules and controls signal transmission therebetween. A communication module is connected to the central module for transmitting alarm signals to an operator remote from the system in order that the operator may become apprised of the status of the gas cylinders and take any necessary action.

18 Claims, 5 Drawing Sheets

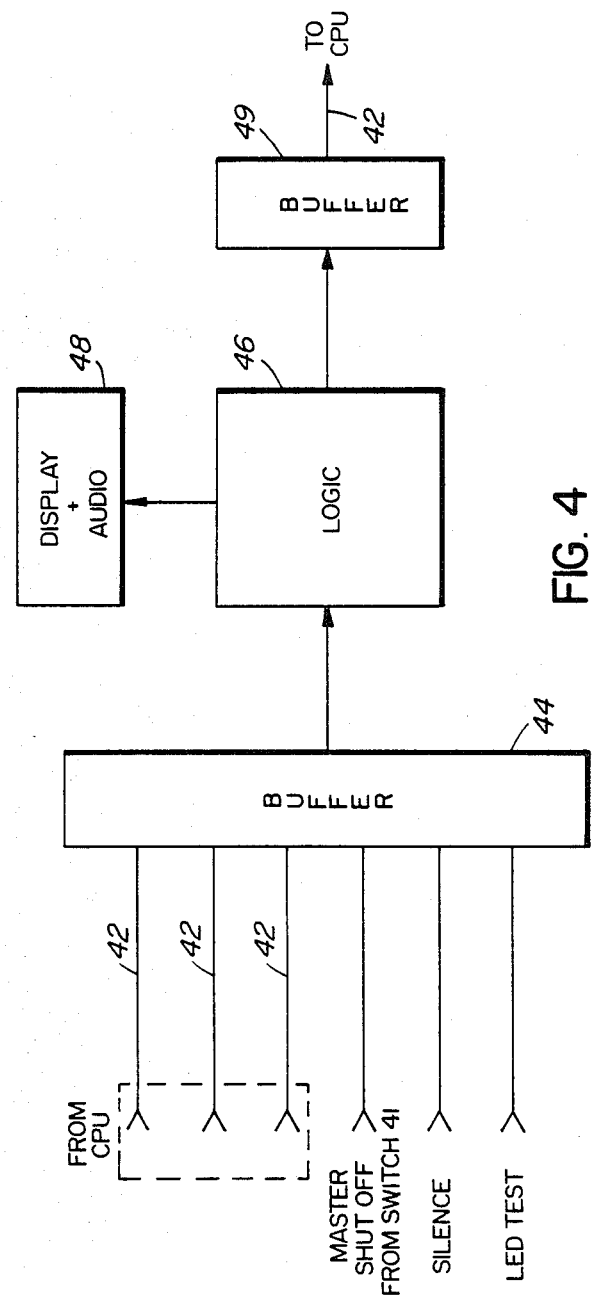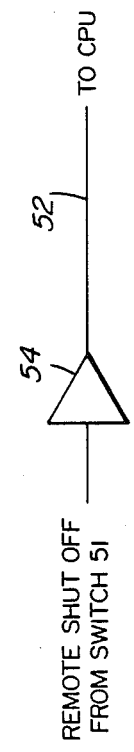

GAS CYLINDER MONITOR AND CONTROL SYSTEM

This invention relates in general to control systems and more particularly to a system for monitoring the status of gas cylinders containing pressurized toxic gases and controlling the operation of valves connected thereto.

Chemical processing systems such as semiconductor fabrication or biochemical production facilities, typically utilize gases or organic compounds which are toxic in nature. Accordingly, various control systems have been developed for monitoring and shutting down gas cylinders or storage tanks in the event of failure or any dangerous situation detected within the tanks or piping circuits.

For example, U.S. Pat. No. 4,298,955 (Munday et al) shows a general system of computer control monitoring of any desired parameters of a chemical processing system. The data is analysed and displayed, indicating any potentially hazardous situation. This system is analogous to the "black box" recorders utilized in modern day aircraft. Thus, the system merely records deviations in a process, for subsequent analysis, yet does not provide an alarm system, or any distributed monitoring or control of the process in the event of a system abnormality.

U.S. Pat. No. 4,424,559 (Lorinca et al.) shows a biochemical processing system with monitoring and control means. One or more sensor signal receivers are disposed in the system for operation in conjunction with a controller for implementing a failure scheme. In particular, various malfunction alarms or process failure alarms can be operated from each of a plurality of modules disposed in a central controller, causing an LED or light to blink, or causing a buzzer to be actuated at the central controller.

U.S. Pat. No 4,430,959 (Ebata et al) deals with vapor phase growth of semiconductor layers, monitoring gas flow, and controlling valves in the gas flow lines. Alarm messages are generated in response to "processing errors38 being detected during execution of a program for controlling the process. An analog-to-digital converter is utilized for receiving an analog signal, such as a feedback signal from a detector, that detects flow quantities flowing through respective control valves. The analog-to-digital converter communicates the digital signal to a controller via an input/output bus.

Temperature, flow quantity voltages applied to various valves, etc., are monitored, and in the event of an abnormal situation, instructions are executed for temporarily stopping the progress of the sequence. Subsequently, an alarm is displayed at the central console.

Each of the patents of Lorincz et al and Ebata et al disclose sensing and monitoring of process steps in chemical systems, and generation of alarm signals in the event of abnormalities. However, according to these prior art patents, the alarm conditions are displayed only at a central console. Thus, in the event of toxic gas leakage in the vicinity of the central console, it would be difficult if not impossible to reach the console without protective breathing apparatus, etc., in order to shut down the system. Furthermore, in the event the central console is left unattended and an alarm condition develops, the condition could go unnoticed, resulting in leakage of the toxic gases into the ventilation system and possible risk of explosion in the event the gas is combustible.

According to the present invention, a system is provided for monitoring and controlling distributed functions within a building. A first plurality of distributed modules generate status signals corresponding to the status of one or more of the functions, such as pressure and temperature within a gas cylinder. The modules each include apparatus, such as valves, for controlling the functions. A second plurality of modules are provided for displaying the status signals generated by the first modules at strategic locations within the building, such as at the point of use of the gases (i.e. a diffusion furnace, etc.). The displayed status signals can be in the form of a visual indication of which of a plurality of gas cylinders is malfunctioning, or an audible alarm for indicating extremely dangerous conditions. Each of the second plurality of modules also includes circuitry for generating a remote command signal, such as a signal for causing remote shut off of one of the valves connected to one or more of the gas cylinders.

A central module is provided for receiving the status signals from one or more of the first plurality of modules and transmitting the status signals for display at each of the plurality of second modules, and receiving the remote command signals from the one or more second plurality of modules and transmitting the command signals to a predetermined one or more of the first modules for controlling the aforementioned functions, such as valve closure, etc.

Furthermore, a communication module is preferably provided within the central module, for transmitting the status signals (i.e. alarm signals) to an operator remote from the systems. The communication module can be in the form of a PACX, PABX, or radio pager. Thus, the operator may become apprised of the status of the malfunctioning gas cylinder and take any appropriate action.

According to a preferred embodiment, a system is provided for monitoring and controlling distributed functions within a building in which toxic gases are used. The system is comprised of a first plurality of modules connected to storage means containing the gases, for effecting emergency shut off of the storage means, and for detecting dangerous conditions at the storage means and generating alarm signals in response thereto. A second plurality of modules are located at strategic locations within the building, for receiving and displaying the alarm signals remote from the storage means, and including means for generating command signals for causing remote shut off of a predetermined one or more of the storage means. A third plurality of modules is provided within main corridors of the building, for generating the aforementioned command signals for causing remote shut off of a predetermined one or more of the storage means. A fourth module is located at a security or guard office of the building, for displaying the location of each of the first plurality of modules, and in the event of generation of alarm signals by a predetermined one or more of the first modules, identifying the location of the predetermined first modules. The fourth module also includes means for generating a further command signal for causing remote shut off of all of the storage means, (i.e. master shut off). A central module interconnects the first, second, third and fourth modules and translates the alarm signals generated by the first modules to the second modules, and translates the command signals generated by the second, third and fourth modules to the first module.

Since the system according to the present invention incorporates distributed monitoring and control, the disadvantages of the prior art systems resulting from only local alarm generation at the central console, are overcome. Thus, an individual walking down a main corridor of the building, or a security guard at the central security office of the building can be alerted to a malfunction within a gas cylinder in a bunker remote from the corridor or security office. The individual may then initiate remote shut off of one or more of the gas cylinders remote therefrom, without exposure to dangerous gases.

Furthermore, a technician remote from the central console or gas storage tanks, may be alerted to a dangerous situation by means of the communication module, such as a pager, so that the alarm condition does not go unnoticed.

Figure 2:
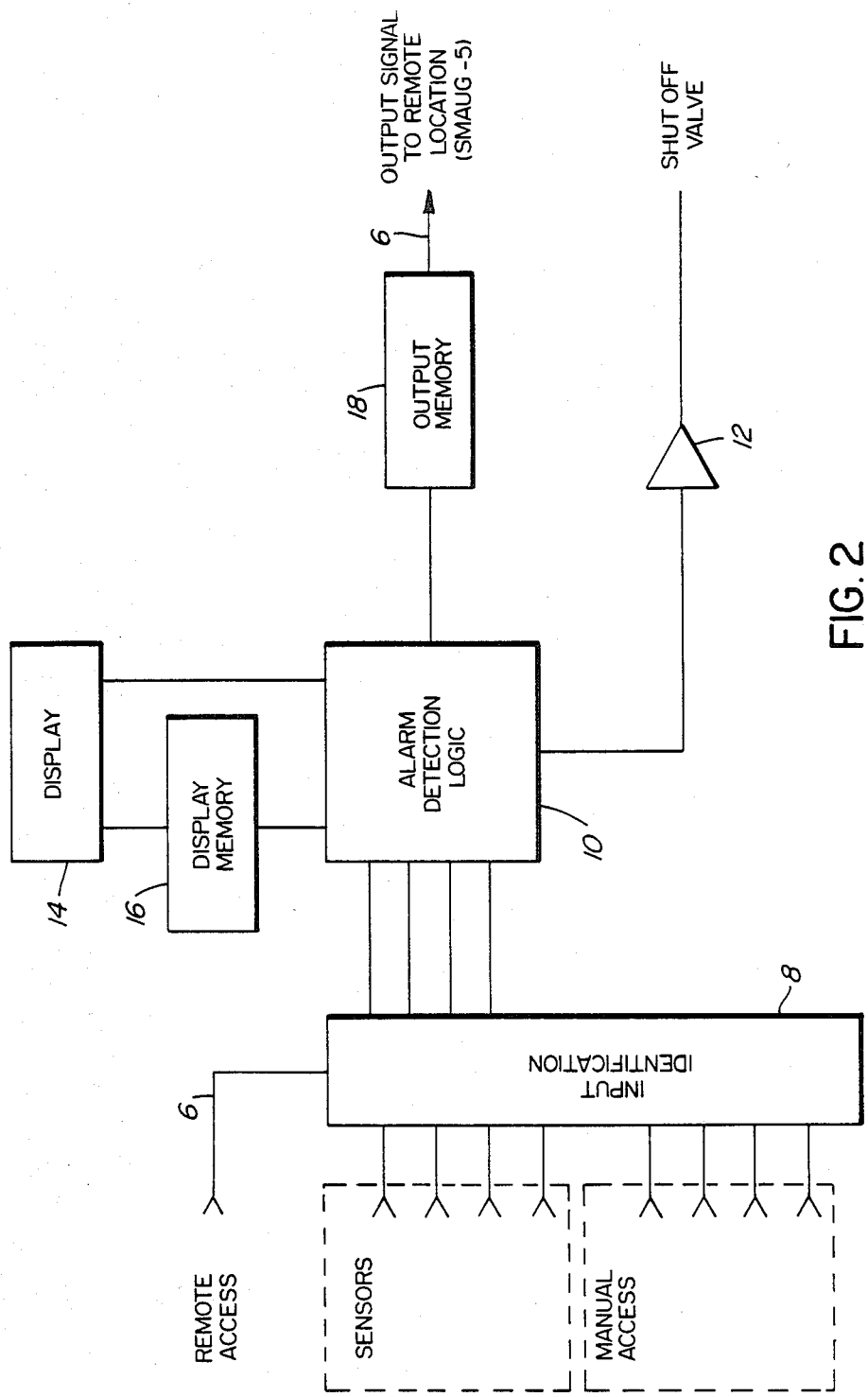
Figure 3A:
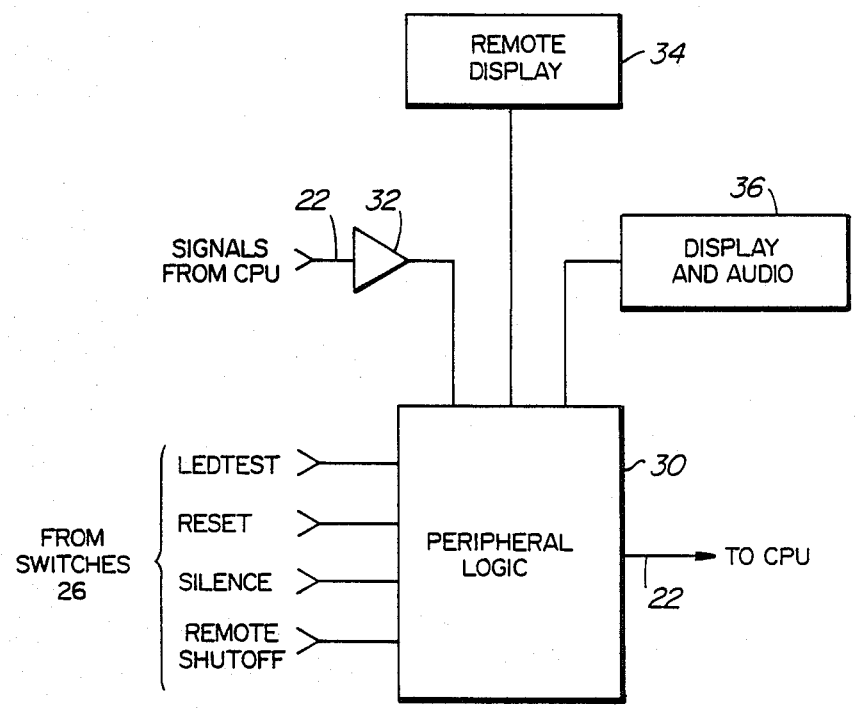
Figure 3B:
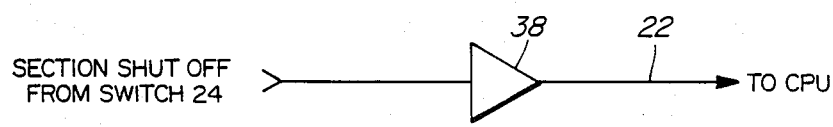
Figure 6:
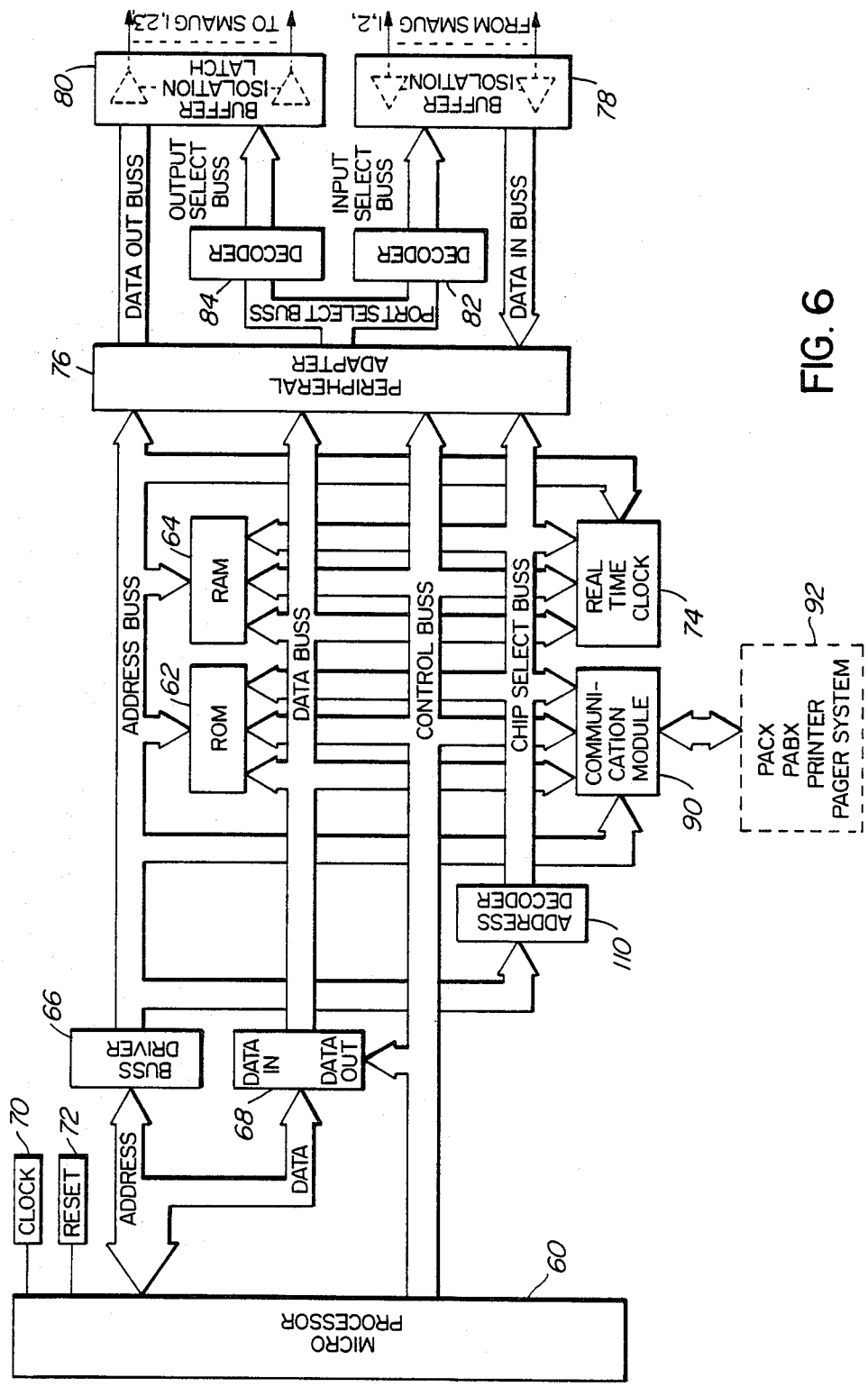

A better understanding of the invention will be obtained with reference to the detailed description below in conjunction with the following drawings, in which:

FIG. 1 is a schematic illustration of the system according to a preferred embodiment of the present invention, FIG. 2 is a block schematic diagram of circuitry included within a first type of module, according to the preferred embodiment, FIGS. 3A and 3B are block schematic diagrams of circuitry included within a second type of module according to the preferred embodiment, FIG. 4 is a schematic block diagram of circuitry included within a third type of module according to the preferred embodiment, FIG. 5 appears out of consecutive order after FIGS. 3A and 3B, and shows a block schematic diagram of circuitry included within a fourth type of module according to the preferred embodiment, and FIG. 6 is a schematic diagram illustrating circuitry incorporated within a central module according to a preferred embodiment.

With reference to FIG. 1, a system is shown for monitoring and controlling distributed functions within a building, such as a semiconductor fabrication plant, in accordance with the present invention. A plurality of gas storage tanks 1 are housed within cabinets 2 which are typically stored within a bunker internally or externally of the building. One or more of a first type of module 3 are associated with respective tanks 1 within each of the cabinets 2. Each of the modules 3 includes high and low pressure signal sensors 4, for detecting high and low gas pressure, temperature, flow rate, etc., and electromechanically controlled valves 5 for shutting off the gas supply from the cylinder 1 in the event of an abnormal condition.

Each of the modules 3 is connected via a plurality of serial data links 6 to a central module 7.

With reference to FIG. 2, each of the modules 3 is shown as being comprised of an input identification circuit 8 for receiving signals from the sensors 4, and from manual access buttons disposed on a front panel thereof. In addition, remote access is provided for receiving command signals from the central module 7 via one of the links 6, resulting in valve closure via an alarm detection logic circuit 10 and a buffer 12.

The input identification circuit 8 receives the signals from sensors 4 and causes display of alarm status signals via display 14 in association with display memory 16, in the event of abnormal conditions being detected by logic circuit 10.

The alarm status signal is also transmitted via output memory 18 and a further one of the serial links 6 to the central module 7.

The display 14 shows the current status of the sensors 4. By activating display memory 16, a previous display can be shown in order to analyze the previous status of the cylinder 1 in the event a sporadic abnormality has occurred but has been subsequently eliminated.

The module 3 generates two different audible tones to indicate whether a detected abnormality constitutes a major or minor alarm. A reset function allows each module 3 to resume its normal operation when all problems have been investigated and corrected. Furthermore, an LED test function allows a technician to check each element of the display, including the audio signal tone generation.

The modules 3 run on low voltage, so as not to consume excess power during power blackouts or brownouts. The sensor and manual access inputs of input identification circuit 8 are prioritized such that in the event of simultaneous inputs, a higher priority signal input is serviced first.

Each of the modules 3 is adapted for operation independently of each of the other modules, and also from the complete system. Each module 3 also includes a key switch for by-passing the alarm status signal generation function, in order to perform maintenance servicing, etc. The module 3 continues to display alarms when by-passed, but does not generate the aforementioned alarm status signal via output serial link 6. Typically, only authorized and trained technicians are provided with a key for by-passing the alarm function.

The front panel of each of the modules 3 includes LED indicators comprising the display 14, a speaker for generating the audible alarm, and various switches for effecting local valve closure etc.

Each module 3 is also equipped with an emergency shut off (panic button), comprising one of the manual access inputs to input identification circuit 8, for emergency shut off of one of the valves 5 connected to the cylinder 1 with which the module is associated.

Returning to FIG. 1, a plurality of modules 20 of a second type are shown connected to the central module 7 via additional serial links 22. The modules 20 are typically located at strategic points within the building, such as at the point of use of the toxic gases, outside diffusion furnaces, etc. The modules 20 provide visual and audible alarm status signals to technicians and operators within the vicinity thereof. The modules are comprised of a plurality of LEDs for displaying the alarm status signals generated by the modules 3. Centrally of the LED display, is a master shut off switch 24 for initiating generation of a command signal for application to serial link 22 and reception by central module 7. In response, central module 7 translates the command signal in order to shut down each of the gas cylinders 1. Furthermore, additional switches 26 are provided for initiating remote shut off of predetermined ones of the cylinders 1. A cylinder which has been shut down may be reset remote therefrom via any one of the modules 20, using the switches 26.

An LED test function is provided, along with a two tone audible alarm, emergency shut off function, major and minor alarm indicators, and a shut off function for each of the gas cylinders 1. Thus, the modules 20 display all alarms to the operators of the equipment which utilize the toxic gases.

With reference to FIGS. 3A and 3B, schematic illustrations are provided of the circuitry associated with the modules 20. In particular, with reference to FIG. 3A, peripheral logic circuit 30 receives control signals from various ones of the switches 26 disposed on the front panel. These control signals are identified as LEDTEST, RESET, SILENCE, and REMOTE SHUTOFF. Command signals, such as to effect remote shut off, are generated in response to receipt of the control signals, and transmitted to central module 7 via an output serial link 22.

Furthermore, signals are received from the central module 7 via a serial link 22 through buffer 32 for display via DISPLAY AND AUDIO circuitry 36, comprising the front panel LEDs and speaker, and via REMOTE DISPLAY 34.

With reference to FIG. 3B, the section shut off signal generated by activating panic button 24, is applied to a buffer 38 and therefrom to the central module 7 via a further one of serial links 22. In response, module 7 translates the section shut off command signal to predetermined ones of the modules 3 for shutting off all cylinders 1 within a bunker.

Returning to FIG. 1, a third type of module 40 is typically installed in a guard's office, such as located at entry points to the building, and displays the location of the first modules 3 and associated gas cylinders 1. A panic button 41 is also included, along with an audio alarm signal output. The module 40 is connected to central module 7 via further serial links 42.

With reference to FIG. 4, internal circuitry of module 40 is illustrated comprising a buffer 44 for receiving control signals denoted as LED TEST and SILENCE from switches disposed on a front panel, and MASTER SHUT OFF from panic switch 41. Input status signals are received from the central module 7 via links 42 for causing illumination of predetermined LEDs forming DISPLAY + AUDIO circuit 48 in response to processing of the status signals via LOGIC circuit 46. The LEDs on the control panel identify the location of various ones of the gas cylinders 1 within the building.

Logic circuit 46 generates the aforementioned MASTER SHUT OFF command signal for transmission to the central module 7 via further serial links 42.

Thus, the module 40 includes a master shut off control for the complete system, a silence witch to disable the audio alarm zone indication, as well as audio and LED test functions.

Returning again to FIG. 1, and with reference to FIG. 5, a fourth type of module 50 is shown comprised of a single panic button switch 51 connected via serial output link 52 through a buffer 54 to the central module 7, for emergency shut off of gas cylinders 1 within a particular zone in the vicinity of the various modules 50. The modules 50 are typically located in the main corridors of the building.

With reference to FIG. 6, circuitry is shown comprising the central module 7. A microprocessor or CPU 60 is connected via CONTROL, DATA, and ADDRESS buses, to ROM and RAM memory circuits 62 and 64. The ADDRESS and DATA buses are interfaced to the microprocessor 60 via bus driver 66 and data latch 68, respectively. The microprocessor 60 is driven by a clock 70, and includes a reset or bootstrap button 72, in a well known manner.

ROM 62 contains a program for co-ordinating transmission of status and command signals throughout the system, and RAM memory 64 maintains a record of such transmissions in conjunction with operation of a real time clock 74.

Respective ones of the ROM 62, RAM 64, peripheral adapter 76, real time clock 74 and communication module 90 are selected by microprocessor 60 via address decoder 110 connected to the ADDRESS BUS and to respective ones of the ROM 62, RAM 64, real time clock 74, peripheral adapter 76 and communication module 90 via a CHIP SELECT BUS.

A peripheral adapter 76 is connected to the address, data, and control buses for interfacing various ones of the first, second, third and fourth module types (i.e. modules 3, 20, 24 and 50). In particular, the modules 3, 20, 40 and 50 are connected via respective ones of the serial links 6, 22, 42 and 52 to input and output buffers 78 and 80, respectively, of module 7. The buffers 78 and 80 are connected in turn via parallel DATA IN and DATA OUT buses to the peripheral adapter 76. A pair of decoders 82 and 84 are connected to the peripheral adapter 76 via a PORT SELECT BUS, and to the input and output buffers 78 and 80 via respective INPUT SELECT and OUTPUT SELECT buses, in a well known manner.

A communication module 90 is provided for connection to an external communication system shown generally as 92, which can be, for instance one or more of a PACX, PABX, printer or radio pager system. For example, with reference to FIG. 1, a PABX 96 is shown connected to a pager 98. Thus, in the event of an alarm status signal generated by one of the modules 3, or in the event of a shut off command signal generated by one of the modules 3, 20, 24 or 50, central module 7 can control PABX 96 for causing a predetermined one or more telephones to ring, or may cause the PABX 96 to generate a speed dial signal for accessing a remote pager 98 to alert a technician to the alarm.

Also, as shown with reference to FIG. 1, the central module 7 can be connected to a host computer 100 for analyzing the alarm status, or displaying a record of previous and current alarm conditions via video terminal 102.

An important feature of the present invention is that the system can communicate all data translated between the modules, to the host computer 100 for processing the data to generate statistical reports, etc.

In addition, a hard copy printout of the alarm condition record can be generated via printer 104.

Thus, the central module 7 scans each function of the remote modules 3, 20, 40 and 50 and translates appropriate commands to various ones of the modules in the event of an alarm condition. In addition, the central module 7 interfaces the entire system to the outside world by means of one or more of a PABX 96, pager 98 or PACX, or host computer 100 via video terminal 102 and printer 104. The central module 7 accommodates variable baud rate transmission, and includes battery back-up to support the RAM memory 64 and the real time clock 74.

In summary, the system according to the present invention provides for distributed monitoring and control of functions within a building, such as the functioning of one or a plurality of gas cylinders containing toxic gases. Emergency or alarm conditions can be serviced remote from the location of the alarm, by means of various distributed modules 20, 40 and 50. In addition, the alarm condition can be communicated to a technician remote from the system, by means of a PABX 96 and pager 98.

By virtue of the distributed nature of the monitor and control system according to the present invention, a virtually fail-safe system is provided for use with toxic gases such as found in semiconductor fabrication or biochemical production facilities.

A person understanding the present invention may conceive of other embodiments or variations therein.

For instance, because the system is modular, the electronics of the central module 7, along with the software running from ROM circuit 62, may be modified in a well known manner, to accommodate greater or fewer, or different types of monitor and control modules, identified as 3, 20, 40 and 50.

The first type of module 3 can be adapted to control more than one cylinder associated therewith, and transmit and receive a greater number of status and command signals.

More importantly, the system of the present invention may be adapted for use in other applications than toxic gas monitor and control. For example, the system could be used to monitor ventilation systems in a building (such as a high-rise), and control motors and/or dampers associated therewith. Likewise, heating and air conditioning systems can be monitored and controlled by using the system of the present invention, suitable modifications being made to the circuitry and display panels associated with the modules 3, 20, 40 and 50.

All such modifications and variations are believed to be within the sphere and scope of the present invention as defined by the claims appended hereto.

We claim:

1. A system for monitoring and controlling distributed functions within a building, comprised of a first plurality of distributed modules for generating status signals corresponding to the status of one or more of said functions and including means for controlling said functions, a second plurality of modules for remote displaying of said status signals, including means for generating remote command signals, and a central module for receiving said status signals from one or more of said first plurality of modules and transmitting said status signals for display at each of said plurality of second modules and receiving said remote command signals from one or more of said second plurality of modules and transmitting said command signals to said means for controlling included within a predetermined one or more of said first modules, whereby remote monitoring and control of distributed functions within said building is effected.

2. A system as defined in claim 1, further including communication means for transmitting said status signals to an operator remote from the system such that the operator may become apprised of the status of said one or more functions and initiate generation of said remote command signals.

3. A system as defined in claim 2, wherein said communication means is comprised of a remote paging system connected to said central module.

4. A system as defined in claim 2, wherein said communication system is selected from the group consisting of a PACX, PABX, printer and pager system.

5. A system as defined in claim 1, for use in a building in which toxic gases are used, said first plurality of modules being connected to storage means for said gases, said status signals being indicative of dangerous conditions detected at said storage means, said means for controlling being comprised of apparatus for providing emergency shut off of said storage means, said command signals being adapted to effect said emergency s hut off, and said means for displaying said status signals being one or both of audio or visual alarm indicators.

6. A system as defined in claim 1, wherein at least one of said first plurality of modules is adapted for connection to one or more toxic substance containers, and is further comprised of:

(a) valve means for shutting said one or more containers in order to prevent the flow of toxic substances therefrom, (b) means for detecting pressure within said containers above a first predetermined level and generating a first one of said status signals in response thereto, (c) means for detecting pressure within said containers below a second predetermined level and generating a second one of said status signals in response thereto, and (d) means for receiving one or more of said command signals from said central module and actuating said valve means in response thereto, to effect remote shut off of said one or more containers.

7. A system as defined in claim 1, wherein at least one of said second plurality of modules is located at a strategic location within said building, and is further comprised of:

(a) means for receiving one or more of said status signals from said central module and generating visual and audio alarm signals in response thereto, (b) first switch means for initiating generation of a first one of said command signals for remote control of a predetermined one of said distributed functions in response to being actuated, and (c) second switch means for initiating generation of a second one of said command signals for remote control of a predetermined plurality of said distributed functions.

8. A system as defined in claim 1, wherein at least one of said second plurality of modules is located at a guard office of said building, and further comprises means for displaying the location within the building of each of said first plurality of modules and identifying a predetermined one or more of said first modules via said means for displaying in the event of generation of one or more status signals by said predetermined one or more first modules, and switch means for initiating generation of an emergency command signal for remote control of all of said distributed functions simultaneously.

9. A system as defined in claim 1, further including an additional plurality of modules located within main corridors of said building, each being comprised of a switch, and means for generating a predetermined command signal for remote control of a predetermined plurality of said distributed functions in response to actuation of said switch.

10. A system as defined in claim 1, wherein said central module is further comprised of a microprocessor connected to a peripheral adapter and a communication module, said microprocessor being adapted to execute a program for controlling said peripheral adapter to receive and transmit said status and command signals between said first and second plurality of modules, and said communication module being adapted to further transmit said status signals to an operator remote from the system such that the operator may become apprised of the status of said one or more functions and take appropriate action.

11. A system for monitoring and controlling distributed functions within a building in which toxic gases are used, comprised of:
   (a) a first plurality of modules connected to storage means containing said gases, for effecting emergency shut off of said storage means, and for detecting dangerous conditions at said storage means and generating alarm signals in response thereto,
   (b) a second plurality of modules located at strategic locations within said building, for receiving and displaying alarm signals remote from said storage means, and including means for generating command signals for causing remote shut off of a predetermined one or more of said storage means,
   (c) a third plurality of modules located within main corridors of said building, for generating said command signals for causing remote shut off of a predetermined one or more of said storage means,
   (d) a further module located at a security office of said building, for displaying the location of each of said first plurality of modules, and in the event of generation of alarm signals by a predetermined one or more of said first modules, identifying the location of said predetermined first modules, and further including means for generating a further command signal for causing remote shut off of all of said storage means, and
   (e) a central module interconnecting said first, second, third and further modules, for translating said alarm signals generated by said first modules to said second modules, and translating said command signals generated by said second, third and further modules to said first modules.

12. A system as defined in claim 11, further including communication means connected to said central module, for transmitting said alarm signals to an operator remote from the system such that the operator may become apprised of said dangerous conditions and take any necessary action in response thereto.

13. A system as defined in claim 12, further including a printer connected to said central module, for generating a hard copy record of all alarm and command signal translations through said central module.

14. A system as defined in claim 12, wherein said communication means is comprised of a PABX.

15. A system as defined in claim 12, wherein said communication means is comprised of a PACX.

16. A system as defined in claim 12, wherein said communication means is comprised of a radio paging system.

17. A system as defined in claim 1, wherein at least one of said first plurality of modules is adapted for connection to one or more toxic substance containers, and is further comprised of:
   (a) valve means for shutting said one or more containers in order to prevent the flow of toxic substances therefrom,
   (b) means for detecting temperature within said containers above a first predetermined level and generating a first one of said status signals in response thereto, and
   (c) means for receiving one or more of said command signals from said central module and actuating said valve means in response thereto, to effect remote shut off of said one or more containers.

18. A system as defined in claim 1, wherein at least one of said first plurality of modules is adapted for connection to one or more toxic substance containers, and is further comprised of,
   (a) valve means for shutting said one or more containers in order to prevent the flow of toxic substances therefrom,
   (b) means for detecting the flow rate of substances from said containers above a first predetermined level and generating a first one of said status signals in response thereto, and
   (c) means for receiving one or more of said command signals from said central module and actuating said valve means in response thereto, to effect remote shut off of said one or more containers.

* * * * *